United States Patent Office 3,775,531
Patented Nov. 27, 1973

3,775,531
ADDING LEAD MAGNESIUM NIOBATE TO LEAD TITANATE/LEAD ZIRCONATE TO AID HOT PRESSING TO TRANSPARENCY
James W. Smith, Painted Post, N.Y., assignor to Corning Glass Works
Filed Oct. 6, 1971, Ser. No. 187,015
Int. Cl. C04b 35/46, 35/48, 35/64
U.S. Cl. 264—332                             7 Claims

ABSTRACT OF THE DISCLOSURE

Disclosed is an electrooptic system including a transparent ferroelectric ceramic element which possesses memory in that a birefringence corresponding to an applied electric field remains after the field is removed. The electrooptic element is hot-pressed from a family of materials which comprises solid solutions of the ternary system, lead magnesium niobate-lead titanate-lead zirconate, and the hot pressed material may additionally contain minor amounts of lead bismuth niobate or bismuth oxide.

BACKGROUND OF THE INVENTION

This invention relates to hot-pressed, transparent, ferroelectric ceramic compositions useful for fabricating polarization changing elements for electro-optic systems.

Electro-optic systems are well known and are described for example, in U.S. Pat. 3,069,973, to I. Ames. Such systems utilize variations in an electric field applied across a transparent active element to produce variations in the refractive index of the element in order to modulate the intensity of polarized light passing through the device. The systems comprise a controllable birefringent element located between two polarizers having their planes of polarization at right angles to one another. The light input passes through the first polarizer and enters the element as plane polarized light. In the absence of an electrical field across the active element, the plane polarized light passes through the element without rotation and is totally absorbed by the second polarizer. However, when an electrical field is applied to the element, the element becomes birefringent, and the light emerges from the element as eliptically or circularly polarized light, part of which passes through the second polarizer, or analyzer. An output device, such as a photomultiplier is disposed at the side of the analyzer remote from the active element and provides the output of the system.

Most prior are electrooptic systems have employed as their active elements monocrystalline forms of various ferroelectric materials. Although single crystals were expensive and could not be grown in sufficiently large sizes, the continued use thereof resulted from the belief that satisfactory polycrystalline materials free from deleterious surface effects due to grain boundaries and porosity and of sufficient transparency to provide electrooptic effects could not be produced.

Wafers of transparent, hot-pressed ferroelectric polycrystalline material have recently been made by first preparing a polycrystalline composition in powder form by solid state reaction of the proper ingredients and then hot-pressing the resultant powders while applying pressure thereto. A description of these materials and a method of forming them are found in the publication "Hot-Pressed Ferroelectric Lead Zirconate Titanate Ceramics for Electro-Optical Applications" by G. H. Haertling, The American Ceramic Society Bulletin, vol. 49, No. 6, June 7, 1970, pp. 564–567. The base system of lead zirconate titanate is not transparent per se but can be made transparent by the addition of small amounts of bismuth oxide or lanthanum oxide. Lead zirconate titanate ceramics must be subjected to hot pressing for 16 hours or more in order to become transparent, and these materials incur a displacive phase transition upon cooling which can create microcracks and localized strains in the resultant element. Moreover, the spontaneous polarization of these elements is relatively high, causing a large charge flow when polarization switching voltages are applied thereto. It is thought that this spontaneous polarization is responsible for some degradation of electrooptic properties.

SUMMARY OF THE INVENTION

Therefore, an object of the present invention is to provide an improved transparent ferroelectric ceramic composition and an electrooptic element made therefrom. Another object is to provide a transparent ferroelectric ceramic composition having low spontaneous polarization and high symmetry. A further object is to provide a hot-pressed, transparent, ferroelectric, ceramic composition which undergoes little or no displacive phase transistion upon cooling from hot-pressing temperatures. Still another object is to provide a method of hot-pressing to transparency a ferroelectric ceramic composition in a period of time that is much shorter than that required to hot-press prior transparent ferroelectric ceramic compositions.

This invention generally relates to a hot-pressed transparent ferroelectric composition which exhibits a remanent, electric field induced birefringence after the electric field is removed. The composition consists essentially of a solid solution of lead magnesium niobate, lead titanate and lead zirconate, wherein the lead magnesium niobate is present in the range of 24–50 mole percent, the lead titanate is present in the range of 6–56 mole percent and the lead zirconate is present in the range of 20–70 mole percent. The composition may additionally comprise 0–1.5 mole percent bismuth oxide or 0.3 mole percent lead bismuth niobate. The forementioned solid solution can be formed into a transparent, ferroelectric ceramic material by hot-pressing at a temperature between 875° C. and 1225° C. for at least 3 hours.

DETAILED DESCRIPTION

Figure 1:
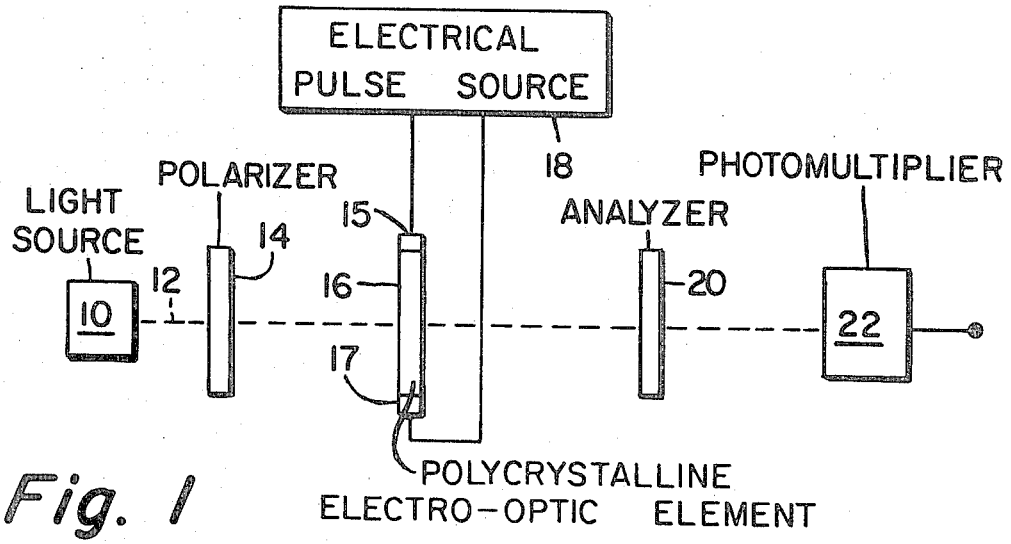
FIG. 1 is a schematic representation of a light modulator in which the novel transparent ferroelectric ceramic material of the present invention may be utilized.

There are many applications in the optical and electrical arts for electrooptic systems which utilize the optical properties of the material to which the present invention relates. The light modulating or light switching system of FIG. 1 is used for purposes of illustration. Referring to this figure, a light source 10, for example, a gas laser with an output of 6328 A., directs a light beam along a light transmission path indicated by broken line 12 to a polarizer 14. After passing through polarizer 14, the light enters a wafer-shaped active element 16 which may be made from the hot-pressed transparent ferroelectric ceramic material to which the present invention relates. A variable voltage is applied transverse to the direction of the light from source 18 through electrodes 15 and 17 which are in contact with opposing edges of element 16. The required electric field could also be established in element 16 by spaced electrodes disposed on a single major surface thereof. An analyzer 20 has its plane of polarization perepndicular to that of polarizer 14. The electric field resulting from the voltage applied to electrodes 15 and 17 may be applied at an angle of 45° with respect to the planes of polarization of polarizer 14 and analyzer 20. Light passing through analyzer 20 is detected by photomultiplier 22, the output of which may be connected to an amplifier or other utilization means. Element 16 possesses memory in that a portion of the birefringence remains after the electric field is removed.

Figure 2:
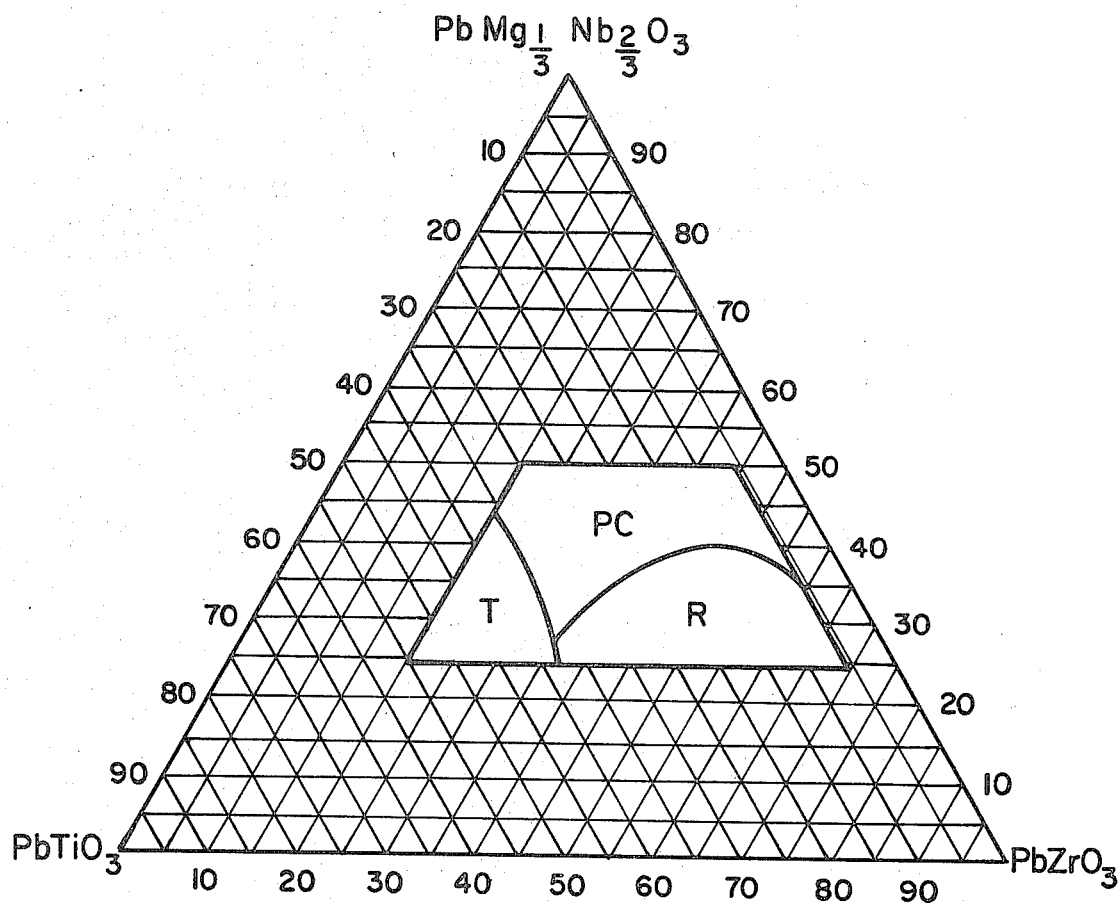
FIG. 2 is a ternary diagram for the base system $PbMg_{1/3}Nb_{2/3}O_3$-$PbTiO_3$-$PbZrO_3$, indicating the composition field wherein suitable transparent ferroelectric ceramic bodies may be formed.

In accordance with the present invention element 16 consists essentially of a solid solution of lead magnesium niobate ($PbMg_{1/3}Nb_{2/3}O_3$), lead titanate ($PbTiO_3$) and lead zirconate ($PbZrO_3$) within the composition field illustrated in FIG. 2. The base system defined by the trapezoid in FIG. 2 consists essentially of 24–50 mole percent lead magnesium niobate, hereinafter referred to as PMN, 6–56 mole percent lead titanate, hereinafter PT, and 20–70 mole percent lead zirconate, hereinafter PZ. The transparent, ferroelectric electrooptic composition of the present invention may be made by mixing PbO, $MgCO_3$, $TiO_2$, $ZrO_2$ and $Nb_2O_5$ in the appropriate proportions to form one of the base compositions of the ternary diagram of FIG. 2. This mixture is calcined, and the calcined material is thereafter ground and hot-pressed at a temperature between 875° C. and 1225° C. for at least 3 hours. At hot pressing temperatures below about 875° C. transparent elements could not be obtained, and temperatures above 1225° C. caused deterioration in properties due to volatilization of some of the constituents. The material of the present invention can be hot-pressed to transparency in less than one-forth the time required to hot-press transparent ferroelectric elements of lead titanate-lead zirconate system at comparable temperatures and pressures. Transparent material has been made by hot-pressing at about 2000 p.s.i., and it is believed that pressures as low as 1000 p.s.i. could produce transparent material if the temperature were sufficiently high and the hot-pressing time were sufficiently long.

Although the base compositions defined by the ternary diagram of FIG. 2 can be hot-pressed to transparency, minor additions of up to 1.5 mole percent bismuth oxide ($Bi_2O_3$) and up to 3 mole percent lead bismuth niobate ($PbBi_{1/2}Nb_{1/2}O_3$) may be added to enhance transparency. The addition of greater amounts of these additives to the base system gives a yellowish cast to the resultant element indicative of an excessive amount of light being absorbed thereby at the short wavelength end of the visible spectrum and also causes deterioration of electrical properties. Lesser amounts of both of these additives may simultaneously be used so long as the combined effect thereof do not result in the above noted disadvantages. An increase in transparency due to these additives is most noticeable when the hot pressing parameters are such that electrooptic elements having relatively low transparency would have been produced had an additive not been used. However, when optimum hot-pressing conditions are utilized so that the base compositions defined by FIG. 2 are relatively transparent, i.e., the resulting element will transmit at least 50% of an incident collimated light beam, then the transparency is not greatly affected by combining an additive with the base system.

The trapezoid depicted in FIG. 2, within which the preferred compositions lie, is divided into three areas which indicate the crystalline phase of the composition. The areas PC, T and R are indicative of pseudocubic, tetragonal and rhombohedral phases, respectively. These areas were obtained from a diagram appearing in the publication "Piezoelectric Properties of

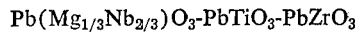

Solid Solution Ceramics" by H. Ouchi et al., Journal of the American Ceramic Society, vol. 48, No. 12, December 1965, pp. 630–635. This article discloses nontransparent compositions which are sintered at temperatures over 1200° C. for use in piezoelectric devices. The tetragonal and rhombohedral compositions formed in accordance with the present invention incur very small displacive phase transistions upon cooling and therefore incur much less strain and micro-crack damage than prior art materials. Since the pseudocubic compositions formed in accordance with this invention incur no displacive phase transitions, these compositions are preferred to those which form in a tetragonal or rhombohedral phase.

The following specific examples are given to enable those skilled in the art to practice the present invention as well as to define the scope thereof.

Example 1

A compound corresponding to 38 mole percent PMN, 11 mole percent PT and 51 mole percent PZ was prepared by mixing 6.69 gm. PbO, 0.321 gm. $MgCO_3$, 1.01 gm. $Nb_2O_5$, 0.252 gm. $TiO_2$ and 1.885 gm. $ZrO_2$ and grinding the resultant batch in acetone for 3 hours. This mixture was then dried and pelleted into a disc which was placed on a cold pressed zirconia setter and fired in air for 4 hours at 875° C. The resulting calcine was then reground in acetone, dried and fired for 3 hours at 450° C. to decompose any organic residue. The resulting ferroelectric powder was pressed into a pellet ¼" in diameter and ¼" long and then hot-pressed in air at 925° C. and 6000 p.s.i. for 4 hours. The hot-pressed pellet was ground and polished to form an electro-optic element having a thickness of 3 mils.

In an electrooptic device such as that illustrated in FIG. 1, wherein the light eminating from a controllable birefringent element 16 must pass through a polarization analyzer, the birefringent element must be transparent to the extent that the polarization of the light eminating therefrom is discernible. Therefore, the polished element was examined under a polarizing microscope to determine its ability to retain extinction. If the examined material will not retain its polarization, and it will not be possible to extinguish it with the analyzer. The element produced in accordance with this example gave good extinction in the polarizing microscope as well as between crossed nicols on an optical bench with a 6328 A. gas laser as a light source.

Nichrome-gold electrodes were evaporated on opposing edges of the sample which was then mounted in the apparatus schematically shown in FIG. 1. Polarized 6328 A. light could be transmitted through the element and extinguished by the analyzer, and birefringence, which could be induced by an electric field, partly remained when the field was removed. Transmission occurred for light wavelengths between 4200 A. and 10 microns. This element possessed a spontaneous polarization $P_s$ of 16 $\mu C/cm.^2$, a squareness S of 0.9, a dielectric constant of 1200 and a resistivity of $10^{14}$ ohm cm. Since this material is a relaxor dielectric, all dielectric constant measurements were made at 1 kHz. so that values obtained for different compositions could be compared.

Example 2

A compound corresponding to 42 mole percent PMN, 28 mole percent PT and 30 mole percent PZ was prepared by mixing 6.696 gm. PbO, 0.354 gm. $MgCO_3$, 1.110 gm. $Nb_2O_5$, 0.671 gm. $TiO_2$ and 1.110 gm. $ZrO_2$, and the resultant batch was prepared into a hot pressed pellet in a manner similar to that described in Example 1. Transparency was roughly comparable to that of the element of Example 1. The resistivity of the resultant material was about $10^{14}$ ohms/cm. and the dielectric constant was 1400. This material had a spontaneous polarization $P_s$ of 18 $\mu C/cm.^2$ and a squareness S of 0.93.

Table I sets forth five additional examples, the compositions of which are located within the preferred composition range depicted in the ternary diagram of FIG. 2.

TABLE I

| Examples | 3 | 4 | 5 | 6 | 7 |
|---|---|---|---|---|---|
| Base constituents: | | | | | |
| $PbMg_{1/3}Nb_{2/3}O_3$ | 30 | 30 | 50 | 38 | 38 |
| $PbTiO_3$ | 20 | 10 | 30 | 11 | 11 |
| $PbZrO_3$ | 50 | 60 | 20 | 51 | 51 |
| Additives: | | | | | |
| $PbBi_{1/2}Nb_{1/2}O_3$ | | | | 2 | |
| $Bi_2O_3$ | | | | | 0.25 |

Each of the compositions set forth in Table I were formed into transparent ferroelectric elements in a manner similar to that described in connection with Example 1. The base constituents of Examples 6 and 7 are identical to those of Example 1, Examples 6 and 7 also containing additives which improved transparency. In order to permit a comparison between Examples 1, 6 and 7, the following data are given for Examples 6 and 7.

In addition to the base constituents which comprise the elements of Example 1, the composition of Example 6 was formed so that it comprised an addition of 2 mole percent lead bismuth niobate ($PbBi_{1/2}Nb_{1/2}O_3$). This resulted in a material having a dielectric constant of 1100, a spontaneous polarization of 14$\mu C/cm.^2$ and a squareness of 0.85. The element of Example 6 was more transparent than that of Example 1, and collimated light transmission through the Example 6 element was about triple that through the element of Example 1.

The element of Example 7 was made by adding 0.25 mole percent $Bi_2O_3$ to the batch described in connection with the preparation of Example 1. This resulted in a material having a dielectric constant of 1200, a spontaneous polarization of 15$\mu C/cm.^2$ and a squareness of 0.9. The Example 7 element was more transparent than that of Example 1 and collimated light transmission through the Example 7 element was about twice that through the Example 1 element.

Example 8

This example, which utilizes the same mole percent of PMN, PT and PZ that is utilized in Example 1, illustrates the effect of process parameter variation on transparency. Although the same ratio of PbO, $MgCO_3$, $Nb_2O_5$, $TiO_2$ and $ZrO_2$ was utilized, the purity of the chemicals was higher in this example. After following the calcining and grinding steps set forth in Example 1, the resulting ferroelectric powder was hot pressed in air at 1100° C. and 3500 p.s.i. for 6½ hours. Collimated light transmission through the resulting electrooptic element, which was ground and polished to a 3 mil thickness, was about 50–55%.

Those skilled in the art will appreciate that elements possessing even greater transparency can be produced by utilizing hot pressing equipment capable of maintaining higher temperatures and pressures for longer periods of time. It is thought that transparencies near the maximum theoretical value will be achievable by improving hot-pressing parameters, and that the addition of the aforementioned additives to such compounds will not appreciably increase the transparency thereof.

To illustrate the characteristics of compositions outside the preferred composition field defined by FIG. 2, Examples 9–13 are presented in Table II.

TABLE II

| Examples | 9 | 10 | 11 | 12 | 31 |
|---|---|---|---|---|---|
| Base constituents: | | | | | |
| $PbMg_{1/3}Nb_{2/3}O_3$ | 50 | 20 | 20 | 40 | 54 |
| $PbTiO_3$ | 0 | 40 | 60 | 44 | 20 |
| $PbZrO_3$ | 50 | 40 | 20 | 16 | 26 |

Although prepared in a manner similar to that by which Examples 1–7 were prepared, the compositions of Examples 9–13 were not acceptable for use in electrooptic elements. Example 9 is characteristic of those compositions which did not contain a sufficient amount of lead titanate. The resultant composition was not transparent and exhibited a poor hysteresis loop. Base compositions located near the lead titanate-lead zirconate join of FIG. 2 could not be hot-pressed to transparency. Example 10 was translucent and exhibited a poor hysteresis loop. Compositions containing too much lead titanate reduced and turned dark, and electrooptic elements made from such compositions arced through when an electric field was applied thereto. These compositions also exhibited high dielectric loss. The elements produced by Example 11, which contain more lead titanate than is permitted in the preferred composition range, were slightly reduced and were bluish in color. The elements produced by Example 12 were also reduced. Elements containing more than 50 mole percent PMN could be hot-pressed to transparency but their hysteresis loops were not well developed, and their memory properties were degraded. The elements produced by Example 13, which were typical of this group, exhibited poorly developed hysteresis loops, squareness S for these elements being less than 0.8.

I claim:

1. In the method of making a transparent ferroelectric ceramic element comprising the steps of
   forming a solid solution of lead titanate and lead zirconate,
   grinding said solid solution to form a ferroelectric powder, and
   hot pressing said powder at a pressure of at least 2000 p.s.i. for a period of time which is sufficient to form a transparent ferroelectric ceramic element,
   the improvement comprising
   adding lead magnesium niobate to said solid solution, and
   maintaining the ratio of constituents of said solid solution so that said solid solution consists essentially of 24–50 mole percent lead magnesium niobate, 6–56 mole percent lead titanate, and 20–70 mole percent lead zirconate, whereby said powder can be more easily hot-pressed to transparency.

2. A method in accordance with claim 1 wherein said solid solution further comprises an additive selected from the group consisting of an effective amount to enhance transparency up to 1.5 mole percent bismuth oxide and an effective amount to enhance transparency up to 3 mole percent lead bismuth niobate and combinations thereof.

3. A method in accordance with claim 1 wherein the step of hot-pressing is performed at a temperature between 875° C and 1225° C.

4. A method in accordance with claim 3 wherein the step of hot-pressing is performed for a period of time greater than 3 hours and less than 16 hours.

5. A method in accordance with claim 3 wherein the crystalline phase of said transparent ferroelectric ceramic element is pseudocubic.

6. A method in accordance with claim 3 wherein the crystalline phase of said transparent ferroelectric ceramic element is tetragonal.

7. A method in accordance with claim 3 wherein the crystalline phase of said transparent ferroelectric ceramic element is rhombohedral.

References Cited

UNITED STATES PATENTS

| 3,718,723 | 2/1973 | Fraser et al. | 264—332 |
| 3,553,134 | 1/1971 | Ikushima et al. | 106—39 |
| 3,666,666 | 5/1972 | Haertling | 106—39 |

(Other references on following page)

OTHER REFERENCES

Ouchi et al., "Piezoelectric Properties of $Pb(Mg_{1/3}, Nb_{2/3})O_3$-$PbTiO_3$-$PbZrO_3$ Solid Solution Ceramics," December, 1965, J.A.C.S., 630–635.

G. H. Haertling, "Hot-Pressed Ferroelectric Lead Zirconate Titanate Ceramics", Ceramic Bulletin, June 1970, pp 564–567.

G. H. Haertling et al., "Hot Pressed $(Pb, La)(Zr, Ti)O_3$ Ferroelectric Ceramics," J.A.C.S., January 1971, pp. 1–11.

JOHN H. MILLER, Primary Examiner

U.S. Cl. X.R.

106—73.3; 264—66